US011218897B2

(12) United States Patent
Siomina et al.

(10) Patent No.: US 11,218,897 B2
(45) Date of Patent: Jan. 4, 2022

(54) SYSTEM AND METHOD FOR CONTROLLING MEASUREMENT GAPS IN A COMMUNICATION SYSTEM

(71) Applicant: Telefonaktiebolaget LM Ericsson (publ), Stockholm (SE)

(72) Inventors: Iana Siomina, Täby (SE); Christopher Callender, Kinross (GB)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 16/612,878

(22) PCT Filed: Mar. 14, 2018

(86) PCT No.: PCT/SE2018/050250
§ 371 (c)(1),
(2) Date: Nov. 12, 2019

(87) PCT Pub. No.: WO2018/212692
PCT Pub. Date: Nov. 22, 2018

(65) Prior Publication Data
US 2020/0154296 A1    May 14, 2020

Related U.S. Application Data

(60) Provisional application No. 62/506,210, filed on May 15, 2017.

(51) Int. Cl.
*H04W 24/10* (2009.01)
*H04W 72/12* (2009.01)
*H04L 5/00* (2006.01)

(52) U.S. Cl.
CPC .......... *H04W 24/10* (2013.01); *H04L 5/0091* (2013.01); *H04W 72/1289* (2013.01)

(58) Field of Classification Search
CPC .. H04W 24/10; H04W 72/1289; H04L 5/0091
See application file for complete search history.

(56) References Cited

U.S. PATENT DOCUMENTS

2008/0274742 A1* 11/2008 Bi ..................... H04W 36/0088
2018/0213425 A1*  7/2018 Huang .................. H04W 24/10

FOREIGN PATENT DOCUMENTS

EP      3110200 A1    12/2016
WO   2011142710 A1    11/2011
(Continued)

OTHER PUBLICATIONS

Unknown, Author, "New WID on New Radio Access Technology", 3GPP TSG RAN Meeting #75, RP-170847, Dubrovnik, Croatia, Mar. 6-9, 2017, pp. 1-8.

*Primary Examiner* — Ronald B Abelson
(74) *Attorney, Agent, or Firm* — Murphy, Bilak & Homiller, PLLC

(57) ABSTRACT

A system and method for controlling measurements gaps in a communication system (300). In an embodiment, an apparatus (370) is operable in the communication system (300) and includes processing circuitry (375) and memory (380). The apparatus (370) is configured to receive a measurement gap pattern (610, 710) to perform a radio signal measurement from the communication system (300), and determine a limited duration to apply the measurement gap pattern (610, 710) to perform the radio signal measurement. The apparatus (370) is also configured to perform the radio signal measurement during the limited duration of the measurement gap pattern (610, 710).

8 Claims, 11 Drawing Sheets

(56) References Cited

FOREIGN PATENT DOCUMENTS

WO     2015126568 A1    8/2015
WO     2017027066 A1    2/2017

\* cited by examiner

SYSTEM AND METHOD FOR CONTROLLING MEASUREMENT GAPS IN A COMMUNICATION SYSTEM

This application claims the benefit of U.S. Provisional Application No. 62/506,210 entitled "METHODS FOR CONTROLLING MEASUREMENT GAPS DURATION IN NR," filed May 15, 2017, which is incorporated herein by reference.

TECHNICAL FIELD

The disclosure relates to communication systems and, more specifically, to system and method for controlling measurements gaps in a communication system.

BACKGROUND

Radio signal measurements such as inter-frequency measurements in Long Term Evolution ("LTE") of cellular communication systems are conducted during periodic inter-frequency measurement gaps that are configured in such a way that each gap starts at a system frame number ("SFN") and subframe meeting the following conditions: SFN mod T=FLOOR(gapOffset/10) and subframe=gapOffset mod 10, wherein T=MGRP/10 and MGRP stands for "measurement gap repetition period." The Evolved Universal Terrestrial Radio Access Network ("E-UTRAN") provides a single measurement gap pattern with constant gap duration for concurrent monitoring of all frequency layers and radio access technologies ("RATs"). Two configurations are supported by a user equipment ("UE"), with MGRPs of 40 and 80 milliseconds ("ms") and both having a measurement gap length ("MGL") of 6 ms. In practice, due to the switching time, this leaves fewer than 6, but at least 5 full subframes for measurements within each such measurement gap. A shorter MGL has recently been adopted in LTE.

In LTE, measurement gaps are configured by the network to enable measurements on the other LTE frequencies and/or other RATs. The gap configuration is signaled to the user equipment with a radio resource control ("RRC") protocol as part of the measurement configuration. The gaps are common (i.e., shared by) for all frequencies, but the user equipment can only measure one frequency at a time within each gap.

The so-called Fifth Generation ("5G") system, from a radio perspective, is being standardized in the Third Generation Partnership Project ("3GPP") and the so-called New Radio ("NR") is the name for the radio interface. One of the characteristics is the frequency range is extending to higher frequencies than LTE (e.g., above 6 gigahertz ("GHz")), where it is known to have more challenging propagation conditions such as a higher penetration loss. To mitigate some of these effects, multi-antenna technologies such as beamforming may be employed. Yet another NR characteristic is the use of multiple numerologies in a downlink ("DL") and an uplink ("UL") in a cell or for a UE and/or in different frequency bands. Yet another characteristic is the possibility to enable shorter latencies. In view thereof, controlling measurement gaps should be addressed in communication systems such as NR.

SUMMARY

These and other problems may be generally solved or circumvented, and technical advantages may be generally achieved, by advantageous embodiments of the present invention, for example, to apply a measurement gap pattern to perform radio signal measurements in a communication system.

In an embodiment, an apparatus is operable in a communication system and includes processing circuitry and memory. The apparatus is configured to receive a measurement gap pattern to perform a radio signal measurement from the communication system, and determine a limited duration to apply the measurement gap pattern to perform the radio signal measurement. The apparatus is also configured to perform the radio signal measurement during the limited duration of the measurement gap pattern.

In an embodiment, an apparatus is operable in a communication system and includes processing circuitry and memory. The apparatus is configured to determine a limited duration of a measurement gap pattern for a user equipment to perform a radio signal measurement. The apparatus is also configured to provide the measurement gap pattern to the user equipment to perform the radio signal measurement.

The foregoing has outlined rather broadly the features and technical advantages of the present examples in order that the detailed description that follows may be better understood. Additional features and advantages of various examples will be described hereinafter, which form the subject of the claims of the invention. It should be appreciated by those skilled in the art that the conception and specific embodiments disclosed may be readily utilized as a basis for modifying or designing other structures or processes for carrying out the same purposes of different embodiments. It should also be realized by those skilled in the art that such equivalent constructions do not depart from the spirit and scope of the disclosure as set forth in the appended claims.

BRIEF DESCRIPTION OF THE DRAWINGS

For a more complete understanding of the present invention, reference is now made to the following descriptions taken in conjunction with the accompanying drawings, in which.

Corresponding numerals and symbols in the different FIGUREs generally refer to corresponding parts unless otherwise indicated, and may not be redescribed in the interest of brevity after the first instance. The FIGUREs are drawn to illustrate the relevant aspects of exemplary embodiments.

DETAILED DESCRIPTION

Figure 1:
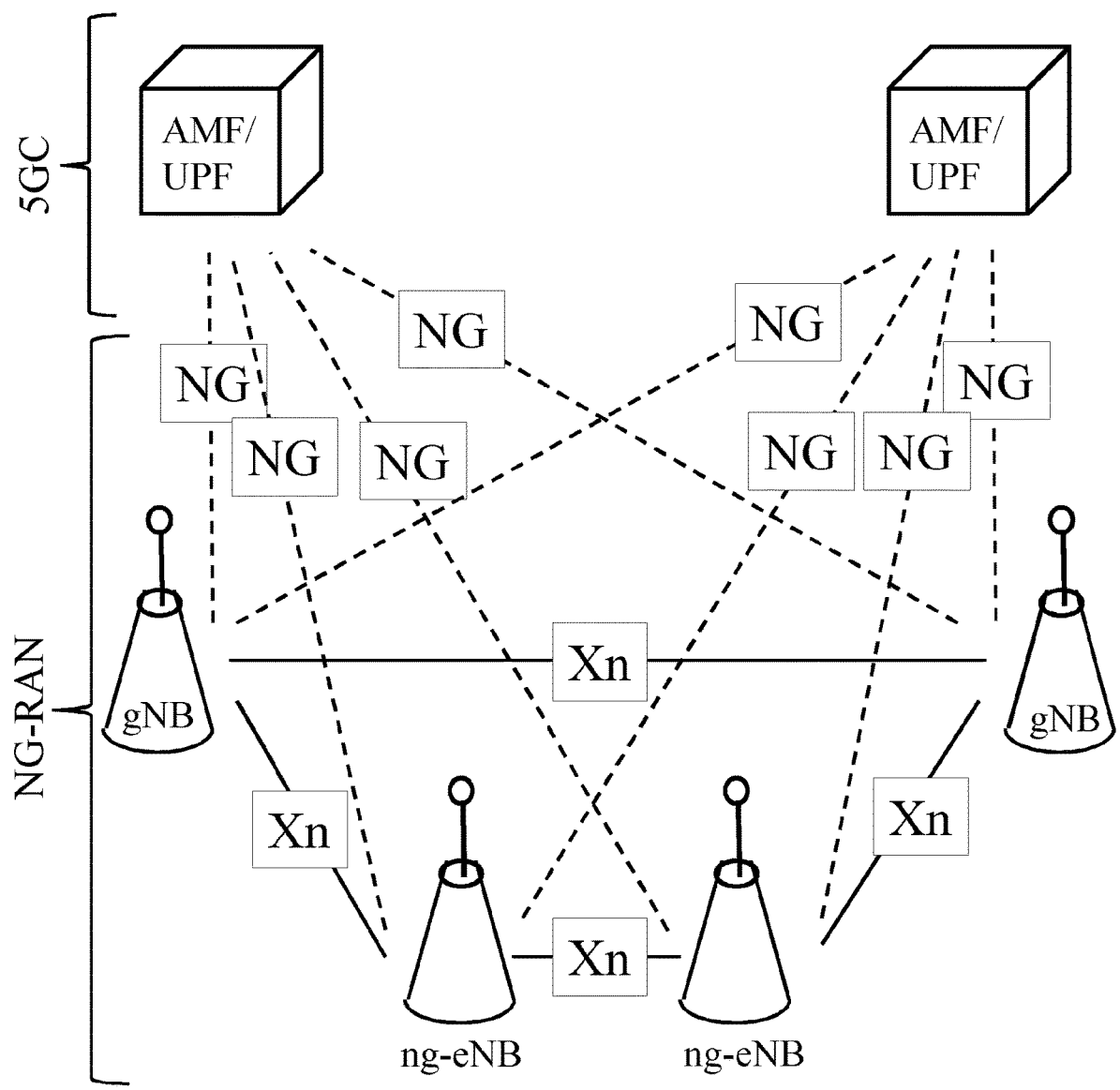
FIGS. 1 to 3 illustrate system level diagrams of embodiments of communication systems.

The making and using of the present exemplary embodiments are discussed in detail below. It should be appreciated, however, that the embodiments provide many applicable inventive concepts that can be embodied in a wide variety of specific contexts. The specific embodiments discussed are merely illustrative of specific ways to make and use the systems, subsystems, and modules for managing measurement gap patterns in a communication system. While the principles will be described in the environment of a Third Generation Partnership Program ("3GPP") 5G communication system, any wireless communication environment is well within the broad scope of the present disclosure.

In some embodiments, a non-limiting term user equipment ("UE") is used. The user equipment can be any type of wireless device—with or without an active user—capable of communicating with a network node or another user equipment over radio signals. The user equipment may also be a radio communication device, a target device, a device to device ("D2D") user equipment, a machine type user equipment or user equipment capable of machine to machine communication ("M2M"), a sensor equipped with a user equipment, an iPad, a Tablet, a mobile terminal, a smart phone, a laptop embedded equipment ("LEE"), a laptop mounted equipment ("LME"), a universal serial bus ("USB") dongle, and customer premises equipment ("CPE"), etc.

Also, in some embodiments, generic terminology "network node" is used. It can be any kind of network node that may include a radio network node such as base station, radio base station, base transceiver station, base station controller, network controller, multi-standard radio base station, gNB, NR base station, evolved Node B ("eNB"), Node B, multi-cell/multicast coordination entity ("MCE"), relay node, access point, radio access point, remote radio unit ("RRU") remote radio head ("RRH"), a multi-standard base station ("MSR BS"), a core network node (e.g., mobility management entity ("MME"), self-organizing network ("SON") node, a coordinating node, positioning node, minimization of drive test ("MDT") node, etc.), or even an external node (e.g., third party node, a node external to the current network), etc. The network node may also include test equipment. The term "radio node" used herein may be used to denote a user equipment or a radio network node. These various nodes will be introduced herein below.

The term "signaling" used herein may include, without limitation, high-layer signaling (e.g., via RRC or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

The term "radio signal measurement" used herein may refer to any measurement performed on radio signals. The radio signal measurements can be absolute or relative. The radio signal measurement may be called as signal level that may be signal quality and/or signal strength. The radio signal measurements can be, for instance, intra-frequency, inter-frequency, inter-RAT measurements, carrier aggregation ("CA") measurements. The radio signal measurements can be unidirectional (e.g., DL or UL) or bidirectional (e.g., round trip time ("RTT"), Rx-Tx, etc.). Some examples of radio signal measurements include timing measurements (e.g., time of arrival ("TOA"), timing advance, round trip time ("RTT"), reference signal time difference ("RSTD"), Rx-Tx, propagation delay, etc.), angle measurements (e.g., angle of arrival), power-based measurements (e.g., received signal power, reference signal received power ("RSRP"), received signal quality, reference signal received quality ("RSRQ"), signal-to-interference-plus-noise ratio ("SINR"), signal-to-noise ratio ("SNR"), interference power, total interference plus noise, received signal strength indicator ("RSSI"), noise power, etc.), cell detection or cell identification, radio link monitoring ("RLM"), system information ("SI") reading, etc. The inter-frequency and inter-RAT measurements are carried out by the UE in measurement gaps unless the UE is capable of doing such measurement without gaps. Examples of measurement gaps are measurement gap id #0 (each gap of 6 ms occurring every 40 ms), measurement gap id #1 (each gap of 6 ms occurring every 80 ms), etc. The measurement gaps are configured by the network node for the UE.

Performing a measurement on a carrier may imply performing measurements on signals of one or more cells operating on that carrier or performing measurements on signals of the carrier (a carrier specific measurement such as RSSI). Examples of cell specific measurements are signal strength, signal quality, etc.

The term measurement performance used herein may refer to any criteria or metric that characterizes the performance of the measurement performed by a radio node. The term measurement performance is also called as measurement requirement, measurement performance requirements, etc. The radio node meets one or more measurement performance criteria related to the performed measurement. Examples of measurement performance criteria are measurement time, number of cells to be measured with the measurement time, measurement reporting delay, measurement accuracy, measurement accuracy with respect to a reference value (e.g., ideal measurement result), etc. Examples of measurement time are measurement period, cell identification period, evaluation period, etc.

The embodiments described herein are applicable to any multicarrier system wherein at least two radio network nodes can configure radio signal measurements for the same user equipment. One specific example scenario includes a dual connectivity deployment with LTE primary cell ("PCell") and NR primary secondary cell ("PSCell"). Another example scenario is a dual connectivity deployment with NR PCell and NR PSCell.

Referring initially to FIG. 1, illustrated is a system level diagram of an embodiment of a communication system such as a 5G/NR communications system. The NR architecture includes terminology such as "NG" (or "ng") denoting new radio, "eNB" denoting an LTE eNodeB, "gNB" denoting a NR base station ("BS," one NR BS may correspond to one or more transmission/reception points), a "RAN" denoting a radio access network, "5GC" denoting a fifth generation ("5G") core network, "AMF" denoting an access and mobility management function, and "UPF" denoting a user plane function. The lines between network nodes represent interfaces therebetween.

FIG. 1 illustrates an overall NR architecture with eNBs and gNBs communicating over various interfaces. In particular, the gNBs and ng-eNBs are interconnected with each other by means of an Xn interface. The gNBs and ng-eNBs are also connected by means of NG interfaces to the 5GC, more specifically to the AMF by means of the NG-C interface and to the UPF by means of the NG-U interface, as described in 3GPP Technical Specification ("TS") 23.501. The architecture and the F1 interface for a functional split are defined in 3GPP TS 38.401.

Figure 2:
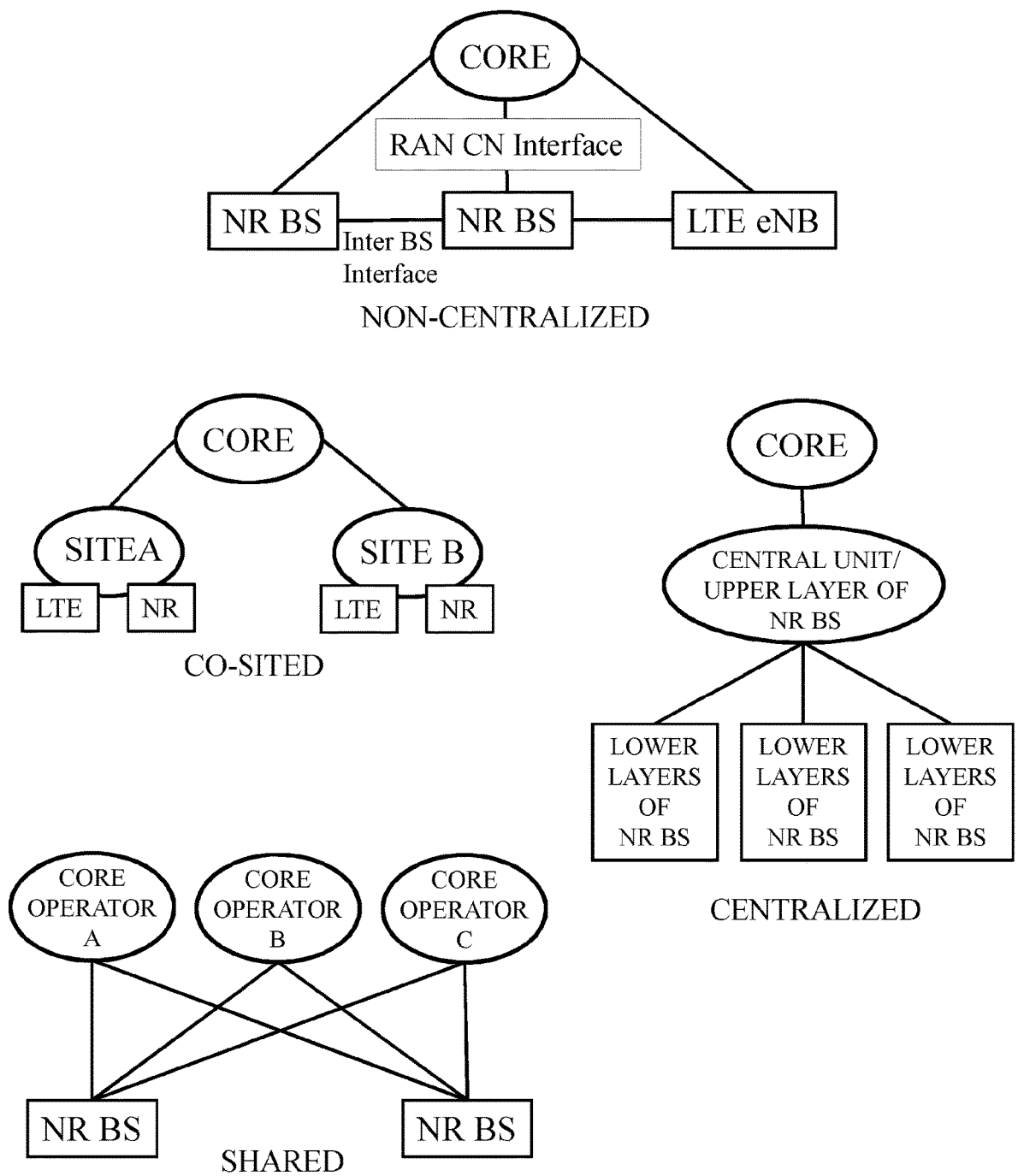

Turning now to FIG. 2, illustrated is a system level diagram of an embodiment of a communication system including 5G/NR deployment examples. The communication system illustrates non-centralized, co-sited, centralized, and shared deployments of NR base stations, LTE base stations, lower levels of NR base stations, and NR base stations connected to core networks.

Both standalone and non-standalone NR deployments may be incorporated into the communication system. The standalone deployments may be single or multi-carrier (e.g., NR carrier aggregation) or dual connectivity with a NR PCell and a NR PSCell. The non-standalone deployments are currently meant to describe a deployment with LTE PCell and NR. There may also be one or more LTE secondary cells ("SCells") and one or more NR SCells.

The following deployment options are captured in NR Work Item Description (RP-170847, "New WID on New Radio Access Technology," NTT DoCoMo, March, 2018). The work item supports a single connectivity option including NR connected to 5G-CN (Option 2 in TR 38.801 section 7.1). The work item also supports dual connectivity options including E-UTRA-NR DC via EPC where the E-UTRA is the master (Option 3/3a/3x in TR 38.801 section 10.1.2), E-UTRA-NR DC via 5G-CN where the E-UTRA is the master (Option 7/7a/7x in TR 38.801 section 10.1.4), and NR-E-UTRA DC via 5G-CN where the NR is the master (Option 4/4A in TR 38.801 section 10.1.3). Dual connectivity is between E-UTRA and NR, for which the priority is where E-UTRA is the master and the second priority is where NR is the master, and dual connectivity is within NR.

At least the following challenges may be envisioned with the existing approaches. The NR signals are configurable for a limited number of transmissions (e.g., a synchronization signal ("SS") block has a limited number of SS bursts). In an LTE cell, cell-specific reference signals ("CRS") are always present. Hence, the LTE measurement gaps are almost always there, i.e., configured without any restriction in time, until a base station sends a reconfiguration. In NR, the configuration of signals is known, including the number of transmit occasions, and thus may be exploited. Signal configurations in LTE can change rather dynamically, providing a single measurement gap configuration and reconfiguring the gaps every time when the signal configuration changes may be not efficient. Accordingly, what is needed in the art is a system and method to avoid these limitations of inter-frequency measurements in a communication system.

Figure 3:
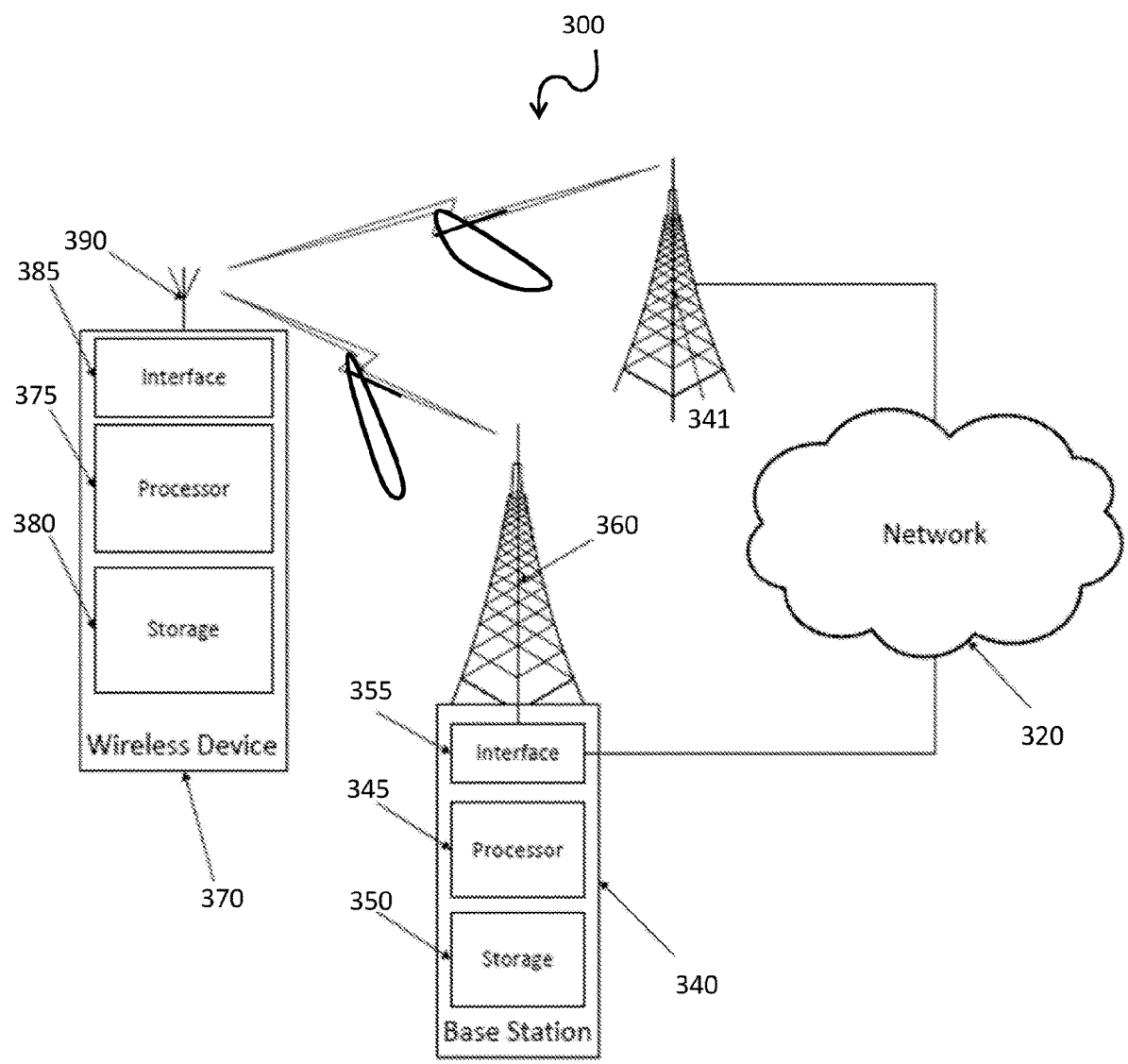

Turning now to FIG. 3, illustrated is a system level diagram of an embodiment of a communication system 300. As discussed above, the solutions described herein may be implemented in any appropriate type of communication system using any suitable components. Particular embodiments of the described solutions may also be implemented in a wireless network such as the example wireless communication system 300 illustrated in FIG. 3. The communication system 300 provides communication and other types of services to one or more wireless devices (also referred to as "user equipment or UE") 370. In the illustrated embodiment, the communication system 300 includes one or more instances of network nodes 340, 341 that facilitate access for the wireless devices 370 to and/or use of the services provided by the communication system 300. The communication system 300 may further include any additional elements suitable to support communication between wireless devices 370 or between a wireless device 370 and another communication device, such as a landline telephone. A network 320 may include one or more Internet protocol ("IP") networks, public switched telephone networks ("PSTNs"), packet data networks, optical networks, wide area networks ("WANs"), local area networks ("LANs"), wireless local area networks ("WLANs"), wired networks, wireless networks, metropolitan area networks, and other networks to enable communication between devices.

The communication system 300 may represent any type of communication, telecommunication, data, cellular, and/or radio network or other type of system. In particular embodiments, the communication system 300 may be configured to operate according to specific standards or other types of predefined rules or procedures. Thus, particular embodiments of the communication system 300 may implement communication standards, such as Global System for Mobile Communications ("GSM"), Universal Mobile Telecommunications System ("UMTS"), Long Term Evolution ("LTE"), and/or other suitable 2G, 3G, 4G, or 5G standards; wireless local area network ("WLAN") standards, such as the IEEE 802.11 standards; and/or any other appropriate wireless communication standard, such as the Worldwide Interoperability for Microwave Access ("WiMax"), Bluetooth, and/or ZigBee standards.

The communication system 300 includes the network nodes 340, 341 and the wireless device 370. For simplicity, FIG. 3 only depicts a network 320, network nodes 340, 341, and a wireless device 370. The network node 340 (and network node 341) includes a processor (or processing circuitry) 345, storage (or memory) 350, an interface 355, and an antenna 360. Similarly, the wireless device 370 includes a processor (or processing circuitry) 375, storage (or memory) 380, an interface 385, and an antenna 390. These components may work together to provide network node and/or wireless device functionality, such as providing wireless connections in a wireless network 320. In different embodiments, the communication system 300 may include any number of wired or wireless networks, network nodes, base stations, controllers, wireless devices, relay stations, and/or any other components that may facilitate or participate in the communication of data and/or signals whether via wired or wireless connections.

As used herein, "network node" 340, 341 refers to equipment capable, configured, arranged and/or operable to communicate directly or indirectly with the wireless device 370 and/or with other equipment in the communication system 300 that enable and/or provide wireless access to the wireless device 370. Examples of network nodes 340, 341 include, but are not limited to, access points ("APs"), in particular radio access points. The network node 340, 341 may represent base stations ("BSs"), such as radio base stations. Particular examples of radio base stations include Node Bs, and evolved Node Bs ("eNBs"). The base stations may be categorized based on the amount of coverage they provide (or, stated differently, their transmit power level) and may then also be referred to as femto base stations, pico base stations, micro base stations, or macro base stations. The "network node" 340, 341 also includes one or more (or all) parts of a distributed radio base station such as centralized digital units and/or remote radio units ("RRUs"), sometimes referred to as remote radio heads ("RRHs"). Such remote radio units may or may not be integrated with an antenna as an antenna integrated radio. Parts of a distributed radio base stations may also be referred to as nodes in a distributed antenna system ("DAS"). As a particular non-limiting example, a base station may be a relay node or a relay donor node controlling a relay.

Yet further examples of network nodes 340, 341 include multi-standard radio ("MSR") radio equipment such as MSR base stations, network controllers such as radio network controllers ("RNCs") or base station controllers ("BSCs"), base transceiver stations ("BTSs"), transmission points, transmission nodes, multi-cell/multicast coordination entities ("MCEs"), core network nodes (e.g., mobile switching centers ("MSCs"), MMEs), operation and maintenance ("O&M") nodes, operation support system ("OSS") nodes, SON nodes, positioning nodes (e.g., an evolved serving mobile location centre ("E-SMLCs")), and/or MDTs. More generally, however, network nodes 340, 341 may represent any suitable device (or group of devices) capable, configured, arranged, and/or operable to enable and/or provide a wireless device 370 access to the communication system 300 or to provide some service to a wireless device 370 that has accessed the communication system 300. As used herein, the term "radio node" is used generically to refer both to the network nodes 340, 341 and the wireless device 370.

Again, the network node 340 (and network node 341) includes the processor 345, the storage 350, the interface 355, and the antenna 360. These components are depicted as single boxes located within a single larger box. In practice, however, a network node 340, 341 may include multiple different physical components that make up a single illustrated component (e.g., the interface 355 may include terminals for coupling wires for a wired connection and a radio transceiver for a wireless connection). As another example, the network node 340, 341 may be a virtual network node in which multiple different physically separate components interact to provide the functionality of the network node 340, 341 (e.g., the processor 345 may include three separate processors located in three separate enclosures, where each processor is responsible for a different function for a particular instance of the network node 340, 341). Similarly, the network node 340, 341 may be composed of multiple physically separate components (e.g., a NodeB component and a RNC component, a BTS component and a BSC component, etc.), which may each have their own respective processor, storage, and interface components. In certain scenarios in which network node 340, 341 includes multiple separate components (e.g., BTS and BSC components), one or more of the separate components may be shared among several network nodes. For example, a single RNC may control multiple NodeBs. In such a scenario, each unique NodeB and BSC pair, may be a separate network node. In some embodiments, the network node 340, 341 may be configured to support multiple radio access technologies ("RATs"). In such embodiments, some components may be duplicated (e.g., separate storage 350 for the different RATs) and some components may be reused (e.g., the same antenna 360 may be shared by the RATs).

The processor (or processing circuitry) 345 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other network node components, such as storage and network node functionality. For example, the processor 345 may execute instructions stored in storage 350. Such functionality may include providing various wireless features discussed herein to the wireless device 370 including any of the features or benefits disclosed herein.

The storage (or memory) 350 may include any form of volatile or non-volatile computer readable memory including, without limitation, persistent storage, solid state memory, remotely mounted memory, magnetic media, optical media, random access memory ("RAM"), read-only memory ("ROM"), removable media, or any other suitable local or remote memory component. The storage 350 may store any suitable instructions, data or information, including software and encoded logic, utilized by the network node 340, 341. The storage 350 may be used to store any calculations made by the processor 345 and/or any data received via the interface 355.

The interface 355 may be used in the wired or wireless communication of signaling and/or data between the network node 340, 341, the network 320, and/or the wireless device 370. For example, the interface 355 may perform any formatting, coding, or translating that may be needed to allow the network node 340, 341 to send and receive data from the network 320 over a wired connection. The interface 355 may also include a radio transmitter and/or receiver that may be coupled to or a part of the antenna 360. The radio may receive digital data that is to be sent out to other network nodes or wireless devices via a wireless connection. The radio may convert the digital data into a radio signal having the appropriate channel and bandwidth parameters. The radio signal may then be transmitted via the antenna 360 to the appropriate recipient (e.g., the wireless device 370).

The antenna 360 may be any type of antenna capable of transmitting and receiving data and/or signals wirelessly. In some embodiments, the antenna 360 may include one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

As used herein, the "wireless device" 370 refers to a device capable, configured, arranged and/or operable to communicate wirelessly with network nodes 340, 341 and/or another wireless device. Communicating wirelessly may involve transmitting and/or receiving wireless signals using electromagnetic signals, radio waves, infrared signals, and/or other types of signals suitable for conveying information through air. In particular embodiments, the wireless device 370 may be configured to transmit and/or receive information without direct human interaction. For instance, a wireless device 370 may be designed to transmit information to a network 320 on a predetermined schedule, when triggered by an internal or external event, or in response to requests from the network 320. Generally, a wireless device 370 may represent any device capable of, configured for, arranged for, and/or operable for wireless communication, for example radio communication devices. Examples of a wireless device (and/or user equipment) 370 include, but are not limited to, smart phones, wireless cameras, wireless-enabled tablet computers, laptop-embedded equipment ("LEE"), laptop-mounted equipment ("LME"), USB dongles, and/or wireless customer-premises equipment ("CPE").

As one specific example, a wireless device 370 may represent a user equipment configured for communication in accordance with one or more communication standards promulgated by the Third Generation Partnership Project ("3GPP"), such as 3GPP's GSM, UMTS, LTE, and/or 5G standards. As used herein, a "user equipment" or "UE" may not necessarily have a "user" in the sense of a human user who owns and/or operates the relevant device. Instead, a user equipment may represent a device that is intended for sale to, or operation by, a human user, but that may not initially be associated with a specific human user. The wireless device 370 may support device-to-device ("D2D") communication, for example, by implementing a 3GPP standard for sidelink communication, and may in this case be referred to as a D2D communication device.

As yet another specific example, in an internet of things ("IoT") scenario, a wireless device 370 may represent a machine or other device that performs monitoring and/or measurements, and transmits the results of such monitoring and/or measurements to another wireless device and/or a network node. The wireless device may in this case be a machine-to-machine ("M2M") device, which may in a 3GPP context be referred to as a machine-type communication ("MTC") device. As one particular example, the wireless device may be a UE implementing the 3GPP narrow band internet of things ("NB-IoT") standard. Particular examples of such machines or devices are sensors, metering devices such as power meters, industrial machinery, or home or personal appliances (e.g., refrigerators, televisions, personal wearables such as watches). In other scenarios, a wireless device 370 may represent a vehicle or other equipment that is capable of monitoring and/or reporting on its operational status or other functions associated with its operation.

A wireless device 370 as described above may represent the endpoint of a wireless connection, in which case the device may be referred to as a wireless terminal. Furthermore, a wireless device as described above may be mobile, in which case it may also be referred to as a mobile device or a mobile terminal.

As depicted in FIG. 3, the wireless device 370 may be any type of wireless endpoint, mobile station, mobile phone, wireless local loop phone, smartphone, user equipment, desktop computer, personal digital assistant ("PDA"), cell phone, tablet, laptop, voice over internet protocol ("VoIP") phone or handset, which is able to wirelessly send and receive data and/or signals to and from a network node, such as network nodes 340, 341 and/or other wireless devices. Again, the wireless device 370 includes the processor 375, storage 380, interface 385, and antenna 390. Like network node 340, 341, the components of the wireless device 370 are depicted as single boxes located within a single larger box, however in practice a wireless device 370 may include multiple different physical components that make up a single illustrated component (e.g., storage 380 may include multiple discrete microchips, each microchip representing a portion of the total storage capacity).

The processor (or processing circuitry) 375 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in combination with other wireless device 370 components, such as storage 380 and wireless device functionality. Such functionality may include providing various wireless features discussed herein, including any of the features or benefits disclosed herein.

The storage (or memory) 380 may be any form of volatile or non-volatile memory including, without limitation, persistent storage, solid state memory, remotely mounted memory, magnetic media, optical media, random access memory ("RAM"), read-only memory ("ROM"), removable media, or any other suitable local or remote memory component. The storage 380 may store any suitable data, instructions, or information, including software and encoded logic, utilized by the wireless device 370. The storage 380 may be used to store any calculations made by processor 375 and/or any data received via the interface 385.

The interface 385 may be used in the wireless communication of signaling and/or data between the wireless device 370 and network node 340, 341. For example, the interface 385 may perform any formatting, coding, or translating that may be needed to allow the wireless device 370 to send and receive data from the network node 340, 341 over a wireless connection. The interface 385 may also include a radio transmitter and/or receiver that may be coupled to or a part of the antenna 390. The radio may receive digital data that is to be sent out to the network node 340, 341 via a wireless connection. The radio may convert the digital data into a radio signal having the appropriate channel and bandwidth parameters. The radio signal may then be transmitted via the antenna 390 to a network node 340, 341.

The antenna 390 may be any type of antenna capable of transmitting and receiving data and/or signals wirelessly. In some embodiments, the antenna 390 may include one or more omni-directional, sector or panel antennas operable to transmit/receive radio signals between 2 GHz and 66 GHz. For simplicity, the antenna 390 may be considered a part of the interface 385 to the extent that a wireless signal is being used.

Figure 4:
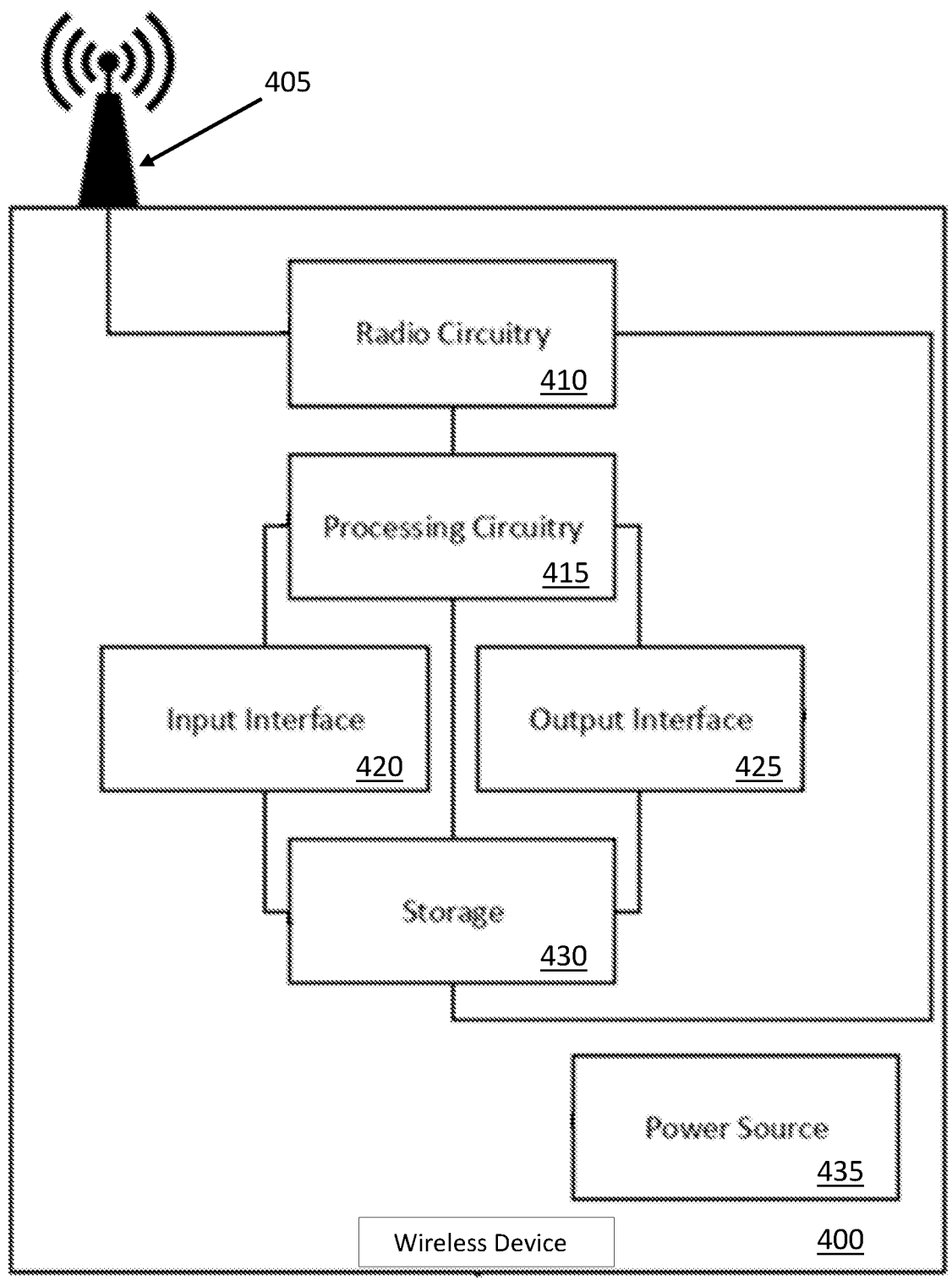
FIG. 4 illustrates a block diagram of an embodiment of a radio node.

Turning now to FIG. 4, illustrated is a block diagram of an embodiment of a radio node such as a wireless device 400. The wireless device 400 includes an antenna 405, radio front-end circuitry (or radio circuitry) 410, processing circuitry (or a processor) 415, and computer-readable storage medium 430. The antenna 405 may include one or more antennas or antenna arrays, and is configured to send and/or receive wireless signals, and is connected to the radio circuitry 410. In certain alternative embodiments, the antenna 405 may be separate from the wireless device 400 and be connectable to the wireless device 400 through an interface or port.

The radio circuitry 410, connected to the antenna 405 and the processing circuitry 415, may include various filters and amplifiers and is configured to condition signals communicated therebetween. In certain alternative embodiments, the processing circuitry 415 may instead be connected to the antenna 405 without the radio circuitry 410.

The processing circuitry 415 may include one or more of radio frequency ("RF") transceiver circuitry, baseband processing circuitry, and application processing circuitry. In some embodiments, the RF transceiver circuitry, baseband processing circuitry, and application processing circuitry may be on separate chipsets. In alternative embodiments, part or all of the baseband processing circuitry and application processing circuitry may be combined into one chipset, and the RF transceiver circuitry may be on a separate chip set. In still alternative embodiments, part or all of the RF transceiver circuitry and baseband processing circuitry may be on the same chipset, and the application processing circuitry may be on a separate chipset. In yet other alternative embodiments, part or all of the RF transceiver circuitry, baseband processing circuitry, and application processing circuitry may be combined in the same chipset. The processing circuitry 415 may include, for example, one or more central processing units ("CPUs"), one or more microprocessors, one or more application specific integrated circuits ("ASICs"), and/or one or more field programmable gate arrays ("FPGAs").

In particular embodiments, some or all of the functionality described herein as being provided by the wireless device 400 may be provided by the processing circuitry 415 executing instructions stored on the computer-readable storage medium 430. In alternative embodiments, some or all of the functionality may be provided by the processing circuitry 415 without executing instructions stored on the computer-readable storage medium 430, such as in a hard-wired manner. In any of those particular embodiments, whether executing instructions stored on the computer-readable storage medium 430 or not, the processing circuitry 415 is configured to perform the described functionality. The benefits provided by such functionality are not limited to the processing circuitry 415 alone or to other components of the wireless device 400, but are enjoyed by the wireless device 400 as a whole, and/or by end users and a wireless network generally.

The antenna 405, radio circuitry 410, and/or processing circuitry 415 may be configured to perform any receiving operations described herein as being performed by a wireless device 400. Any information, data and/or signals may be received from a network node and/or another wireless device.

The processing circuitry 415 may be configured to perform any determining operations described herein as being performed by a wireless device 400. Determining as performed by processing circuitry 415 may include processing information obtained by the processing circuitry 415 by, for example, converting the obtained information into other information, comparing the obtained information or converted information to information stored in the wireless device 400, and/or performing one or more operations based on the obtained information or converted information, and as a result of the processing making a determination.

The antenna 405, radio circuitry 410, and/or processing circuitry 415 may be configured to perform any transmitting operations described herein as being performed by a wireless device 400. Any information, data and/or signals may be transmitted to a network node and/or another wireless device.

The computer-readable storage medium 430 is generally operable to store instructions, such as a computer program, software, an application including one or more of logic, rules, code, tables, etc. and/or other instructions capable of being executed by a processor. Examples of computer-readable storage medium 430 include computer memory (for example, random access memory ("RAM") or read only memory ("ROM")), mass storage media (for example, a hard disk), removable storage media (for example, a compact disk ("CD") or a digital video disk ("DVD")), and/or any other volatile or non-volatile, non-transitory computer-readable and/or computer-executable memory that store information, data, and/or instructions that may be used by the processing circuitry 415. In some embodiments, the processing circuitry 415 and computer-readable storage medium 430 may be considered to be integrated.

Alternative embodiments of the wireless device 400 may include additional components beyond those shown in FIG. 4 that may be responsible for providing certain aspects of the wireless device functionality, including any of the functionality described herein and/or any functionality necessary to support the solution described above. As just one example, the wireless device 400 may include input interfaces, devices and circuits (generally designated 420), and output interfaces, devices and circuits (generally designated 425). Input interfaces, devices, and circuits 420 are configured to allow input of information into the wireless device 400, and are connected to the processing circuitry 415 to allow the processing circuitry 415 to process the input information. For example, input interfaces, devices, and circuits 420 may include a microphone, a proximity or other sensor, keys/buttons, a touch display, one or more cameras, a USB port, or other input elements. Output interfaces, devices, and circuits 425 are configured to allow output of information from the wireless device 400, and are connected to the processing circuitry 415 to allow processing circuitry 415 to output information from the wireless device 400. For example, output interfaces, devices, or circuits 425 may include a speaker, a display, vibrating circuitry, a USB port, a headphone interface, or other output elements. Using one or more input and output interfaces, devices, and circuits 420, 425, the wireless device 400 may communicate with end users and/or the wireless network, and allow them to benefit from the functionality described herein.

As another example, the wireless device 400 may include a power source 435. The power source 435 may include power management circuitry. The power source 435 may receive power from a power supply, which may either be internal or external to the power source 435. For example, wireless device 400 may include a power supply in the form of a battery or battery pack that is connected to, or integrated into, the power source 435. Other types of power sources, such as photovoltaic devices, may also be used. As a further example, the wireless device 400 may be connectable to an external power supply (such as an electricity outlet) via an input circuitry or interface such as an electrical cable, whereby the external power supply supplies power to the power source 435. The power source 435 may be connected to the radio circuitry 410, processing circuitry 415, and/or computer-readable storage medium 430 and be configured to supply the wireless device 400, including the processing circuitry 415, with power for performing the functionality described herein.

The wireless device 400 may also include multiple sets of processing circuitry 415, computer-readable storage medium 430, radio circuitry 410, and/or antenna 405 for different wireless technologies integrated into the wireless device 400, such as, for example, GSM, Wideband Code Division Multiple Access ("WCDMA"), LTE, NR, WiFi, or Bluetooth wireless technologies. These wireless technologies may be integrated into the same or different chipsets and other components within the wireless device 400.

A synchronization sequence ("SS") block and SS burst configurations may be employed with respect to the present disclosure. The signals in an SS block may be used for radio signal measurements on a NR carrier including intra-frequency, inter-frequency and inter-RAT (i.e., NR measurements from another RAT).

A NR-Primary Synchronization Signal (NR-PSS), a NR-Secondary Synchronization Signal (NR-SSS) and/or a NR-Physical Broadcast Channel (NR-PBCH) can be transmitted within an SS block. For a given frequency band, a SS block corresponds to N orthogonal frequency division multiplexing ("OFDM") symbols based on the default subcarrier spacing, and N is a constant. A user equipment can identify at least an OFDM symbol index, slot index in a radio frame, and a radio frame number from an SS block. A single set of possible SS block time locations (e.g., with respect to radio frame or with respect to SS burst set) is specified per frequency band. At least for a multi-beam case, at least the time index of the SS block is indicated to the user equipment. The position(s) of actual transmitted SS blocks can be provided to assist with CONNECTED/IDLE mode measurements, allow a CONNECTED mode user equipment to receive DL data/control in an unused SS block, and potentially for allowing an IDLE mode user equipment to receive DL data/control in an unused SS block.

One or multiple SS block(s) form a SS burst. The maximum number L of SS-blocks within a SS burst set may be carrier frequency dependent. For a frequency range category #A (e.g., 0~6 GHz), for instance, the maximum number L is to be determined within L≤[16]. For a frequency range category #B (e.g., 6~60 GHz), the maximum number L is to be determined within L≤[128].

One or multiple SS burst(s) make up a SS burst set (or series) where the number of SS bursts within a SS burst set is finite. From a physical layer specification perspective, at least one periodicity of SS burst set is supported. From a user equipment perspective, the SS burst set transmission is periodic. At least for an initial cell selection, the user equipment may assume a default periodicity of SS burst set transmission for a given carrier frequency (e.g., one of 5 ms, 10 ms, 20 ms, 40 ms, 80 ms, or 160 ms). A user equipment may assume that a given SS block is repeated with a SS burst set periodicity. By default, the user equipment may neither assume that the gNB transmits the same number of physical beam(s), nor the same physical beam(s) across different SS blocks within an SS burst set. For each carrier, the SS blocks may be time-aligned or overlap fully or at least in part, or the beginning of the SS blocks may be time-aligned (e.g., when the actual number of transmitted SS blocks is different in different cells).

Figure 5:
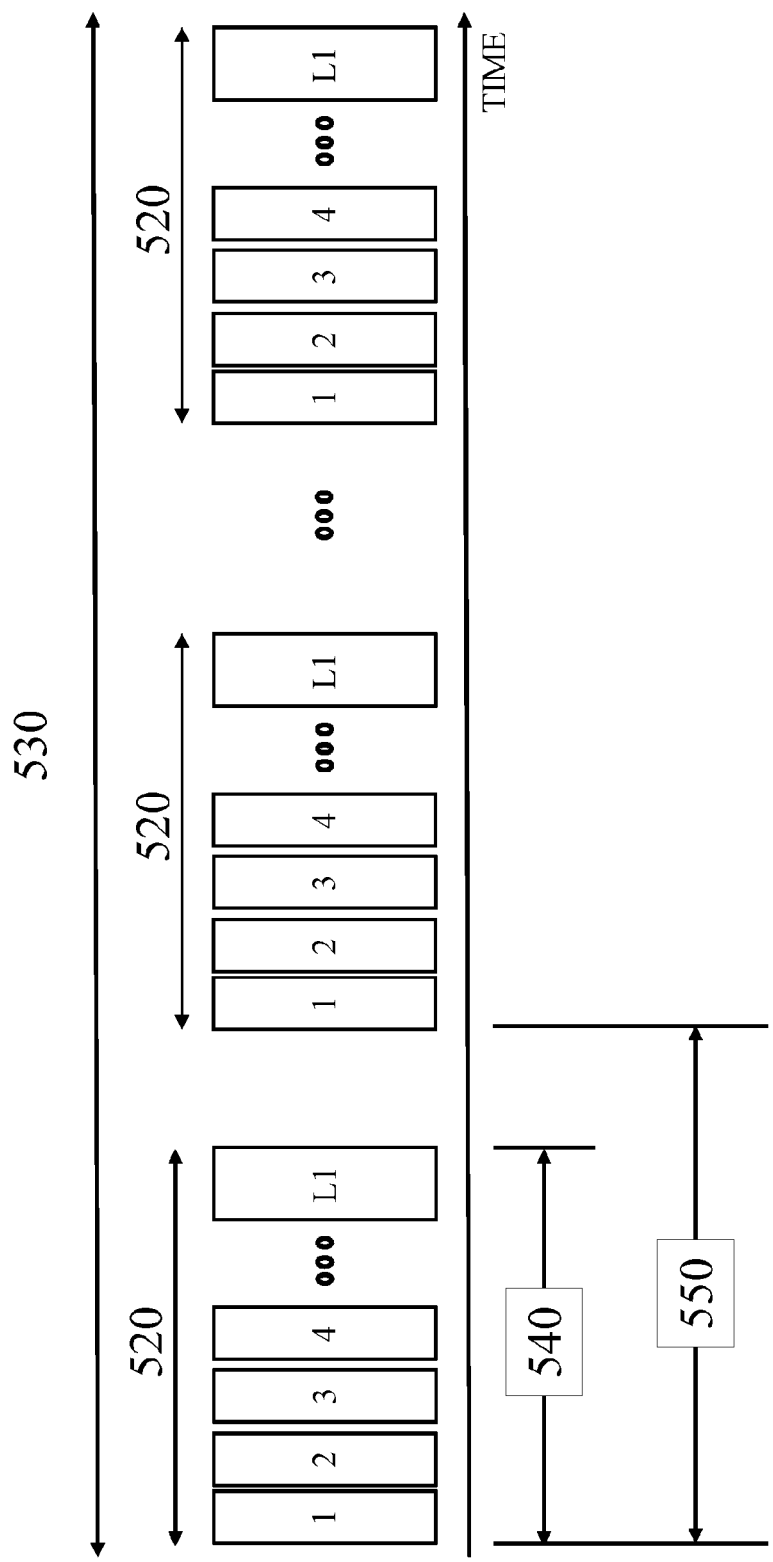
FIG. 5 illustrates a graphical representation of example configurations of synchronization signal blocks, synchronization signal bursts and a synchronization signal burst set/series.

Turning now to FIG. 5, illustrated is a graphical representation example configurations of SS blocks (one of which is designated 510), SS bursts (generally designated 520) and a SS burst set/series 530. The SS bursts 520 are formed with a plurality of SS blocks 510 and a duration 540 for each SS burst 520 is repeated with a periodicity 550.

Figure 6:
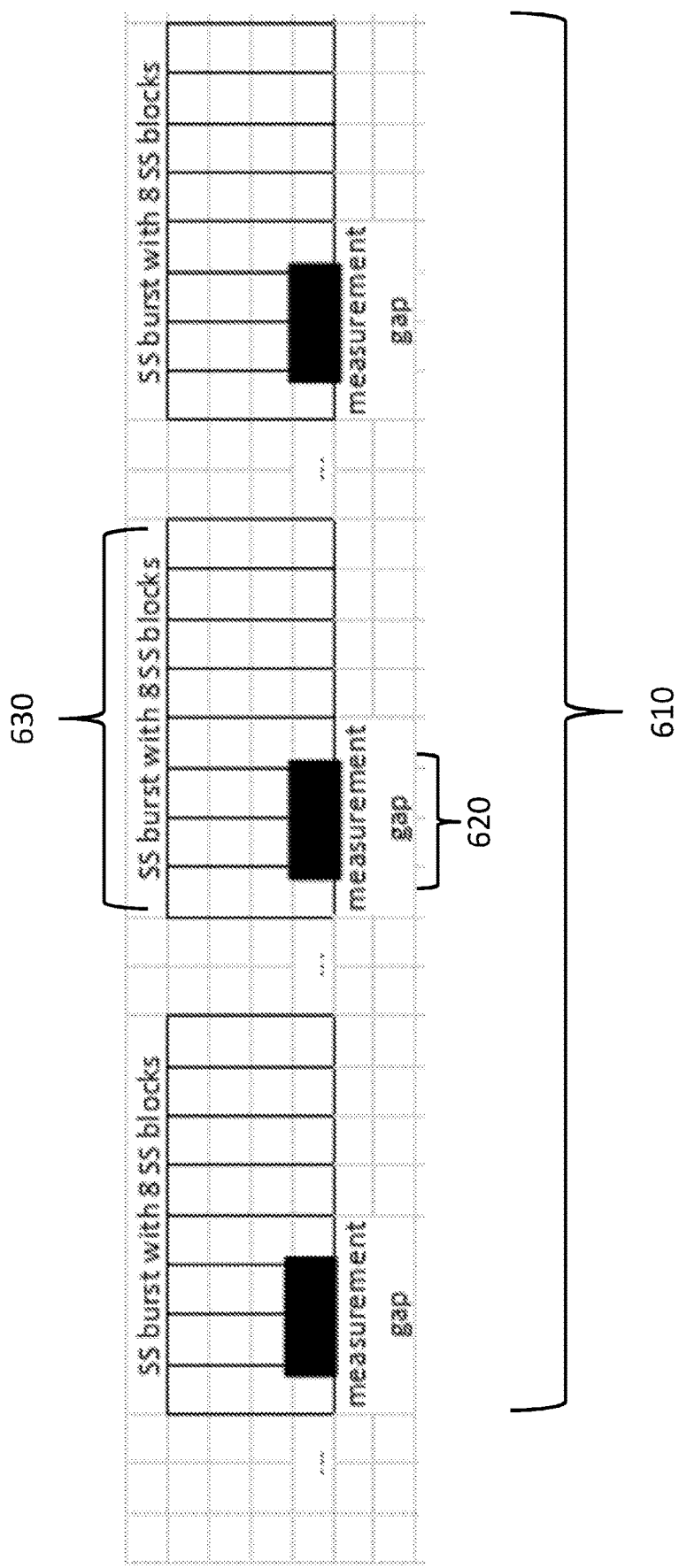
FIGS. 6 to 9 illustrate graphical representations of embodiments of measurement gap patterns with time on the horizontal axis and frequency on the vertical axis.
Figure 7:
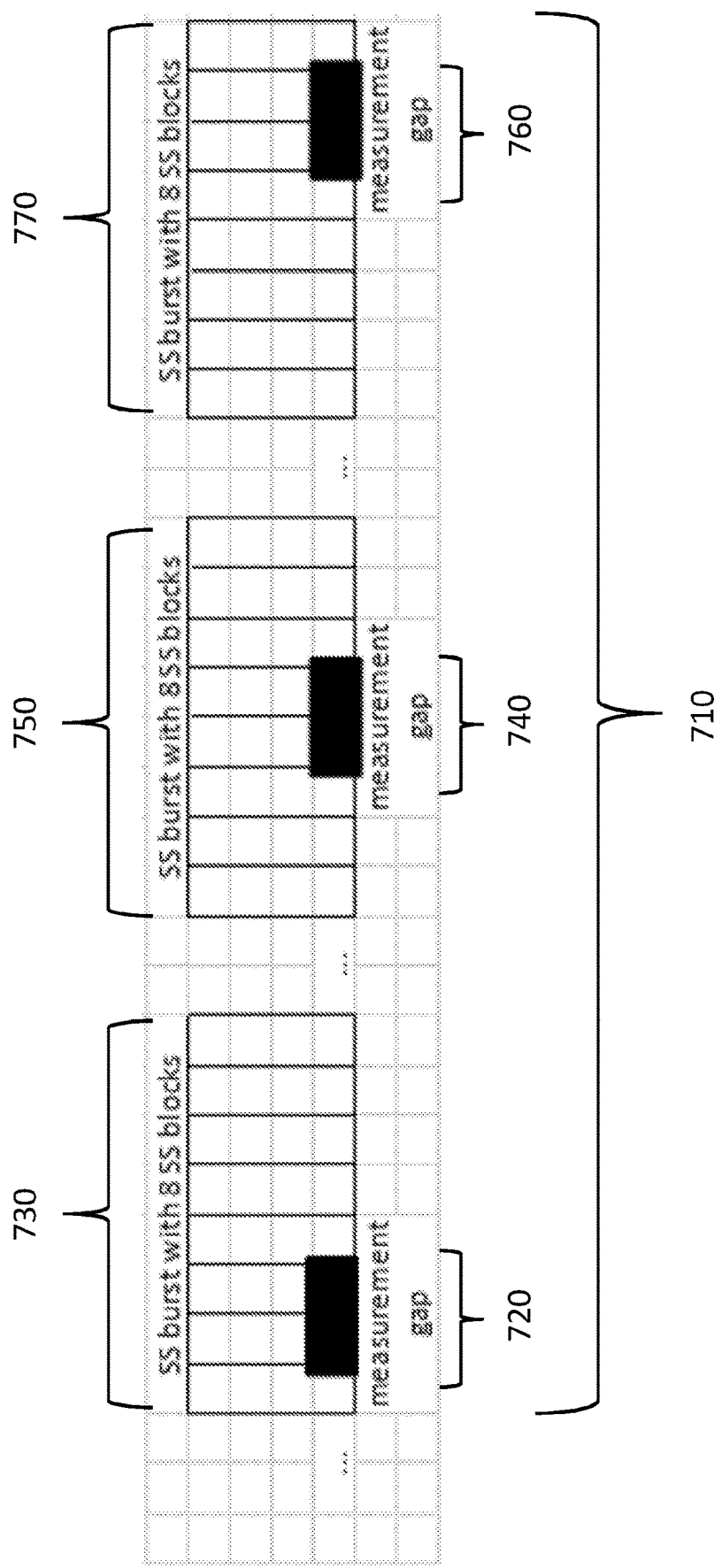

Turning now to FIGS. 6 to 9, illustrated are graphical representations of embodiments of measurement gap patterns with time on the horizontal axis and frequency on the vertical axis. Each block represents time-frequency slots that can be used by a base station for a downlink transmission to a user equipment. Each SS burst in this example is formed with eight SS blocks. FIGS. 6 and 7 illustrate a periodic measurement gap pattern 610 and an aperiodic measurement gap pattern 710, respectively. The periodic measurement gap pattern 610 includes measurement gaps (one of which is designated 620) in the same location of the corresponding SS bursts (one of which is designated 630). The aperiodic measurement gap pattern 710 includes measurement gaps 720, 740, 760 in different locations of the corresponding SS bursts 730, 750, 770.

Figure 8:
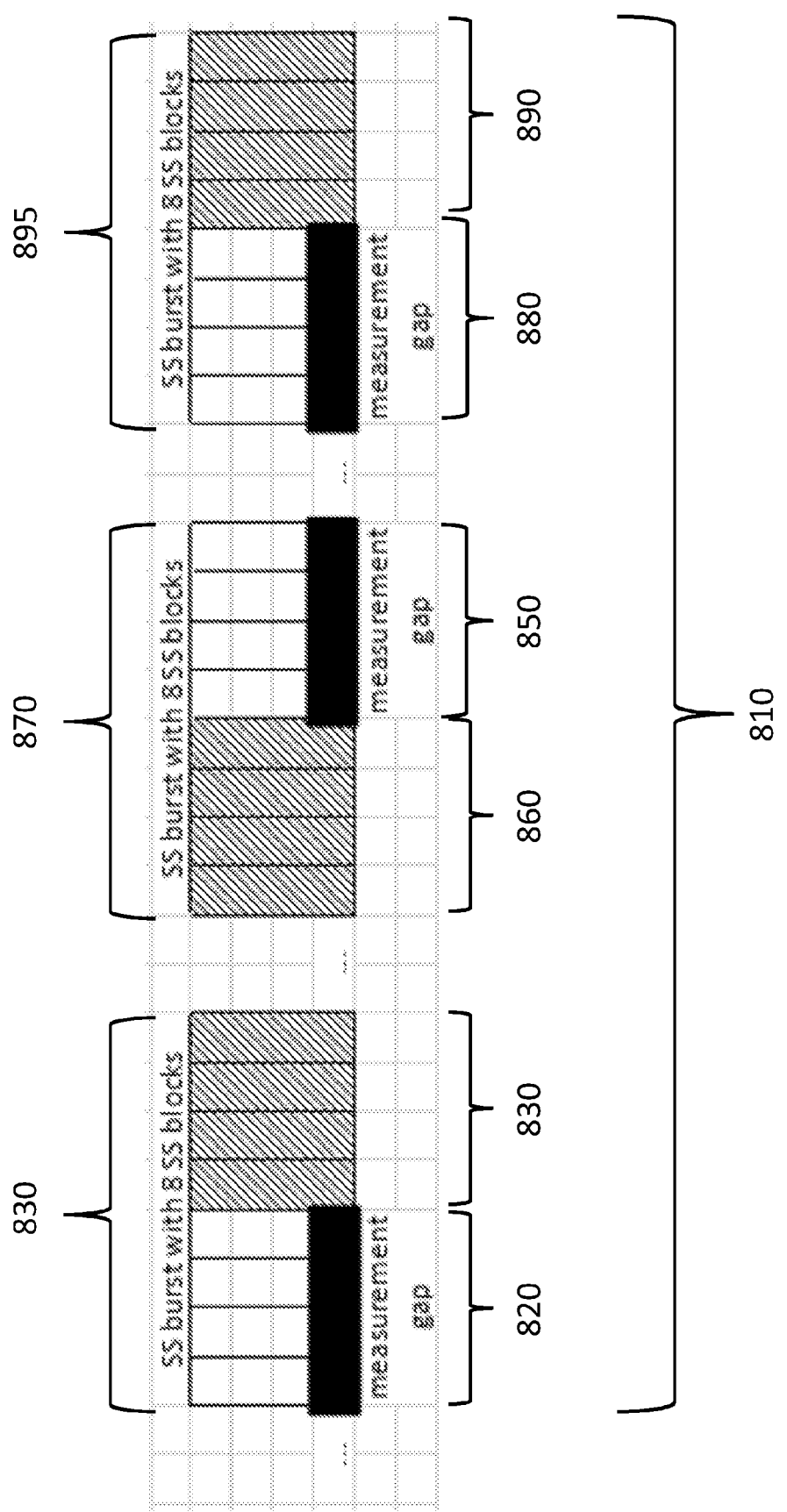
Figure 9:
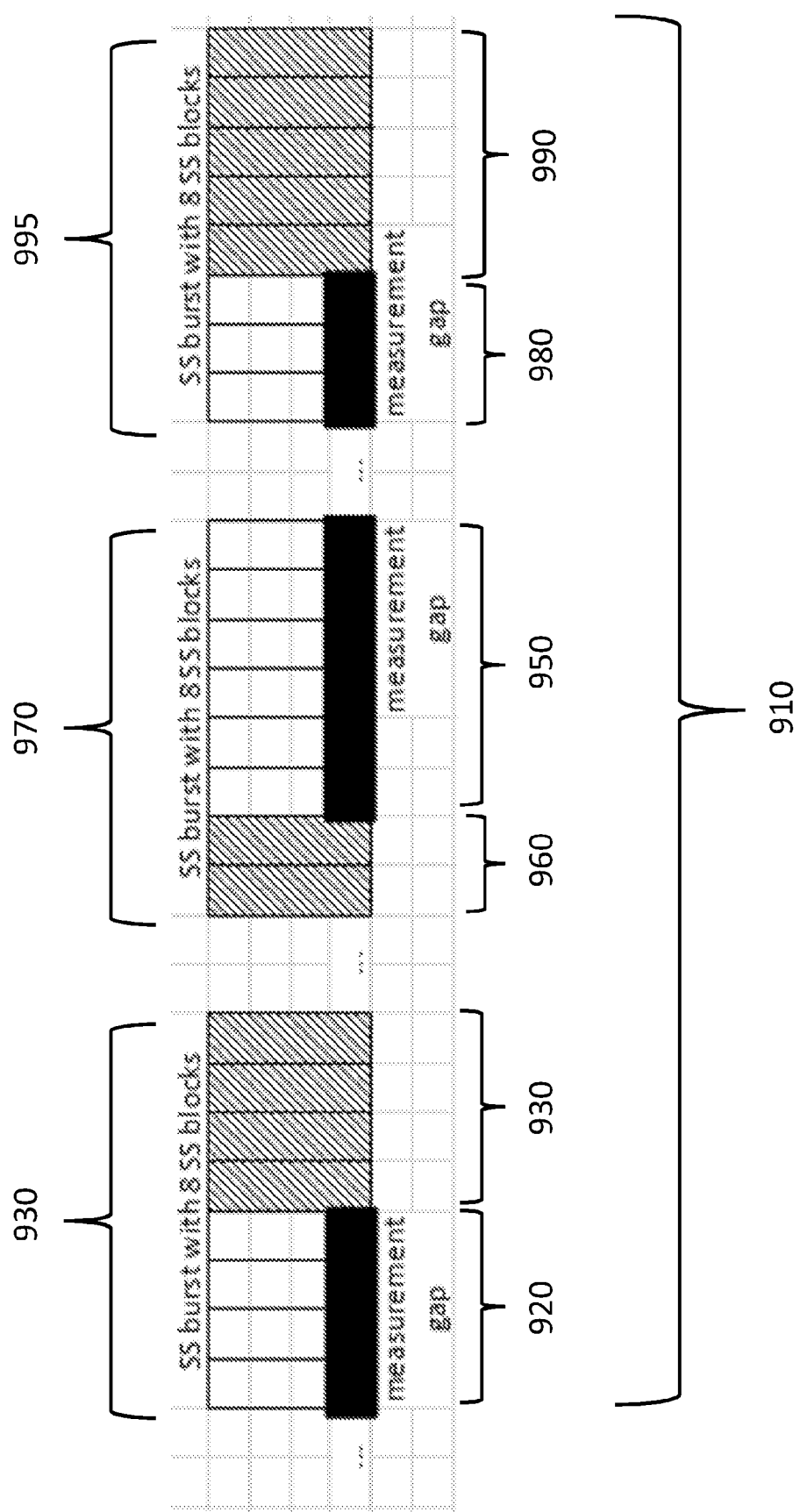

FIGS. 8 and 9 also illustrate aperiodic gap patterns 810, 820 accounting for muting or skipping transmissions of signals in synchronization signal blocks. The dashed blocks are muted signals. The aperiodic gap pattern 810 includes measurement gaps 820, 850, 880 and muted signals 830, 860, 890 in different locations of the corresponding SS bursts 830, 870, 895. The aperiodic gap pattern 910 includes measurement gaps 920, 950, 980 and muted signals 930, 960, 990 in different locations of the corresponding SS bursts 930, 970, 995.

According to an embodiment, a user equipment is configured with a measurement gap pattern of a limited duration (e.g., with a limited number of gaps or pattern repetitions or a limited time of use or validity). The configuration may be received in a variety of manners, including, without limitation, from a network or another user equipment via multicast, broadcast, dedicated signaling; higher layer signaling (e.g., RRC) or lower layer signaling (e.g., control channel). Since there needs to be a shared understanding of when gaps occur in network and user equipment, the limited duration needs to be either explicitly signaled or specified implicitly in 3GPP specifications (for example, implied based on other signaling). Also, the starting and/or the reference point of the gaps needs to be determined.

The limited duration may be determined by the configuring node in different ways. For example, the limited duration may depend on the transmission configuration of signals/channels to be received or measured by the user equipment, for instance, when they are to be transmitted over a limited time. One example is a certain number of transmitted instances; another example is the number of SS bursts in a series or set of SS bursts. The duration may depend on the individual gap length (measurement gap length ("MGL")) or gap periodicity (measurement gap repetition period ("MGRP")). As an example, long gaps and/or frequent (e.g., more frequent than a threshold) gaps can be configured with a limited validity time length only. In a further example, shorter gaps may not employ explicit configuration of a time during which they can be used, for instance they may start implicitly when the initial longer gap validity period expires. The duration may also depend on the measurement time for a specific measurement (e.g., no need to use gaps for longer than the needed measurement time for a specific measurement). The duration may also depend on a measurement event being reported. This may either be an event related to the specific measurement object measured in the gap, or an event related to another measurement object (e.g., serving cell triggers a measurement report). For example, a limited duration is configured when a first event type occurs, and a non-limited duration is configured when a second event type occurs.

According to another embodiment, a user equipment is configured with two or more measurement gap patterns for receiving signals/channels and/or performing measurements on the same carrier. In one example, the user equipment may receive or determine at least one configuration parameter. In another example, the communication system may determine a rule on how and/or when to select/choose the appropriate pattern at a time when the user equipment is configured to use two or more measurement gaps patterns, though not necessarily in parallel (e.g., the user equipment may use a first measurement gap pattern for a certain time and then switch to a second measurement gap pattern, and then it may or may not switch back to the first measurement gap pattern). Since there needs to be a shared (between user equipment and network node) understanding of which measurement gap pattern(s) to use, the switching needs to be either explicitly signaled or specified implicitly in 3GPP specifications (for example, implied based on other signaling).

A configuration parameter for one, some, or all measurement gap patterns may be received from a network node or from another user equipment, for instance, via multicast, broadcast, dedicated signaling; higher layer signaling (e.g., RRC), or lower layer signaling (e.g., control channel). Optionally, the configuration of another measurement gap pattern (if not received from the network node or from the another user equipment) may be determined by the user equipment based on a pre-defined rule, a configuration parameter received for the first measurement gap pattern, and/or a transmission configuration of signals/channels for which the measurement gap patterns are to be used. Examples of the configuration parameter include measurement gap length (e.g., 3 ms or 6 ms), periodicity (e.g., 40 ms and a periodicity different from 40 ms), number of measurement gaps in a pattern, etc.

The user equipment may be configured to select a measurement gap pattern from two or more patterns. The measurement gap patterns may be signaled explicitly by a network node to the user equipment and configured the user equipment make a selection based on the signaled pattern configuration. The user equipment may autonomously determine the measurement gap patterns based on a pre-defined rule and/or condition. The network node may indicate the rule, criteria, or threshold for the user equipment to select the measurement gap pattern. When the selection is performed by the user equipment, the user equipment may also inform the network node about its choice or preference.

The selection may be based on the measurement gap pattern more/most suitable (e.g., the same or similar) for the periodicity of signals/channels to receive using the gaps. The user equipment may select a first measurement gap pattern when there is prior knowledge about the beam or beams that the user equipment is most likely to detect (i.e., the network node may have some prior knowledge about which part of the SS block of neighbor cell(s) is useful to a given user equipment based on which beam that the user equipment is served by or other criteria), otherwise select a second measurement gap pattern. The user equipment may select a first measurement gap pattern when one or all the signals/channels to be received by the user equipment are based on a first numerology, otherwise select a second measurement gap pattern.

The user equipment may select a first measurement gap pattern when the user equipment is at a first coverage level, select a second measurement gap pattern when the user equipment is at a second coverage level. A coverage level may be indicated by a network node and/or determined by the user equipment based on a measurement such as a received signal power or quality of a signal. In the case that the coverage level is determined by the user equipment, the user equipment may make the network node aware that it has moved to a different coverage level, e.g., by reporting a measurement event. Based on measurement events reported by the user equipment, the network node becomes implicitly aware of which measurement gap pattern the user equipment is using.

The user equipment may select a first measurement gap pattern when the user equipment supports a first switching time (e.g., in the beginning and in the end of each measurement gap for retuning to perform the measurements within the gap), and select a second measurement gap configuration otherwise. As an example, when the switching time is above a threshold, the user equipment selects a first measurement gap pattern (e.g., with longer measurement gap lengths or longer duration of measurement gap validity to compensate for a larger loss due to switching time), otherwise it selects a second measurement gap pattern.

The user equipment may select a first measurement gap pattern when the user equipment is not receiving or transmitting information during a first time period, and select a second measurement gap pattern otherwise. In one example, one or more configuration parameters related to the measurement gaps may be received via RRC signaling, but the triggering/instigating of a specific measurement gap pattern may be by means of lower-layer signaling (e.g., a control channel). In a further example, the instigated measurement gaps can be used only for a fixed amount of time or a fixed number of gaps, and/or based on a triggering condition (e.g., if a condition is met then the user equipment selects a first measurement gap pattern otherwise it selects a second measurement gap pattern. Methods for jointly configuring at least one fixed-length measurement gap pattern and multiple measurement gap patterns on a carrier are well within the scope of the present disclosure. For instance, at least one of the two or more measurement gap patterns has a limited length.

According to another embodiment, a measurement gap pattern is configured to cover a portion of an SS burst, for instance, one or several, but not all SS blocks within a SS burst of the same cell. The measurement gaps may be strictly periodic (i.e., equally spaced in time) or may be based on a periodic pattern and have aperiodic, irregular or different time between two closest measurement gaps for at least two pairs of the closest measurement gaps.

In one example, the measurement gap pattern may be determined by a network node and indicated to the user equipment implicitly or explicitly, for instance, by sending one or more parameters or indications to control how the measurement gap pattern is configured by the user equipment. In another example, the configured pattern may be determined by a user equipment based on a pre-defined rule, muting pattern, etc. The configuring may be based on the knowledge of which beams (associated with certain SS blocks) or which SS blocks the user equipment needs to measure within a certain SS burst and/or the knowledge from which beams the configured SS blocks are actually transmitted within a certain SS burst.

The measurement gap configuration may be characterized by at least a length of individual gaps (e.g., 2 ms, 3 ms, or 6 ms) and an offset that selectively controls the measurement gap placement within the SS burst. The offset may be with respect a reference time or reference time unit, for instance, SFN with a certain number or meeting a certain criteria and/or the beginning of the SS burst. For example, the offset may be measured in time units and/or number of SS blocks to skip from the beginning of the SS burst. The measurement gaps may also be configured by means of binary measurement gap patterns where ones may be indicating the beams to be included in a measurement gap.

In one example, in at least two consecutive SS bursts, the measurement gaps cover the sets of SS blocks with the same indexes/locations within the SS burst, for instance, in each SS burst the measurement gaps are configured to receive at least SS block with index N (see FIG. 6). In another example, in at least two consecutive SS burst, the gaps cover the sets of SS blocks with different indexes/locations within the SS burst for at least one SS block (see FIG. 7).

In yet another example, the measurement gaps are configured based on a beam/SS block muting pattern, for instance, in an SS burst the measurement gap pattern covers the actually transmitted SS blocks and not the muted SS blocks (see FIG. 8). There may also be muted SS blocks with a measurement gap, in which case the measurement gaps may be placed to cover the largest possible or at least a certain minimum number of non-muted blocks. Also the measurement gap length may be adapted to the number of SS blocks to measure in individual SS bursts (see FIG. 9).

In one embodiment, the user equipment is configured with a measurement gap pattern of a limited duration, for instance, with a limited number of measurement gaps or pattern repetitions or a limited time of use or validity. The configuration may be received from a network node or another user equipment, or determined by the user equipment itself.

In a second embodiment, the user equipment may be configured with two or more measurement gap patterns for receiving signals/channels and/or performing radio signal measurements on the same carrier. The user equipment selects the appropriate measurement gap pattern at a time. A configuration parameter for one, some or all of the measurement gap patterns may be received from a network node or from another user equipment. Optionally, the configuration of another measurement gap pattern (if not received from the network node or from the user equipment) may be determined by the user equipment based on, without limitation, a pre-defined rule, a configuration parameter for the measurement gap pattern(s), and/or a transmission configuration of signals/channels for which the measurement gap pattern(s) is to be used.

In a third embodiment, the first and the second embodiments may be combined and at least one of the two or more measurement gap patterns has a limited duration. In a fourth embodiment, a measurement gap pattern is configured to cover a portion of an SS burst, for instance, one or several, but not all SS blocks within a SS burst of the same cell. In a fifth embodiment, any one or more of the above embodiments are combined.

The measurement gaps can be for, without limitation, intra-frequency, intra-carrier, inter-frequency, or inter-RAT measurements and/or signal/channel receptions (e.g., reference signals, physical signals, synchronization signals, broadcast or multicast channels and system information ("SI") messages). The corresponding embodiments apply both for the user equipment and configuring node (e.g., a network node or another user equipment).

According to particular embodiments, signaling overhead may be reduced. For instance, signaling fixed-length measurement gaps avoid the need to configure and then deconfigure measurements gaps; provisioning two or more measurement gap patterns in one message and dynamically selecting the appropriate measurement gap pattern is more efficient than sending a measurement gap pattern every time a new configuration is needed. Furthermore, particular embodiments may provide better control of the user equipment measurement gap usage and the impact on serving carriers (the user equipment is not able to receive or transmit during a measurement gap), i.e., the UE would not use the measurement gaps for a longer time than configured. Other advantages may be readily available to one having skill in the art. Certain embodiments may have none, some, or all of the recited advantages.

Figure 10:
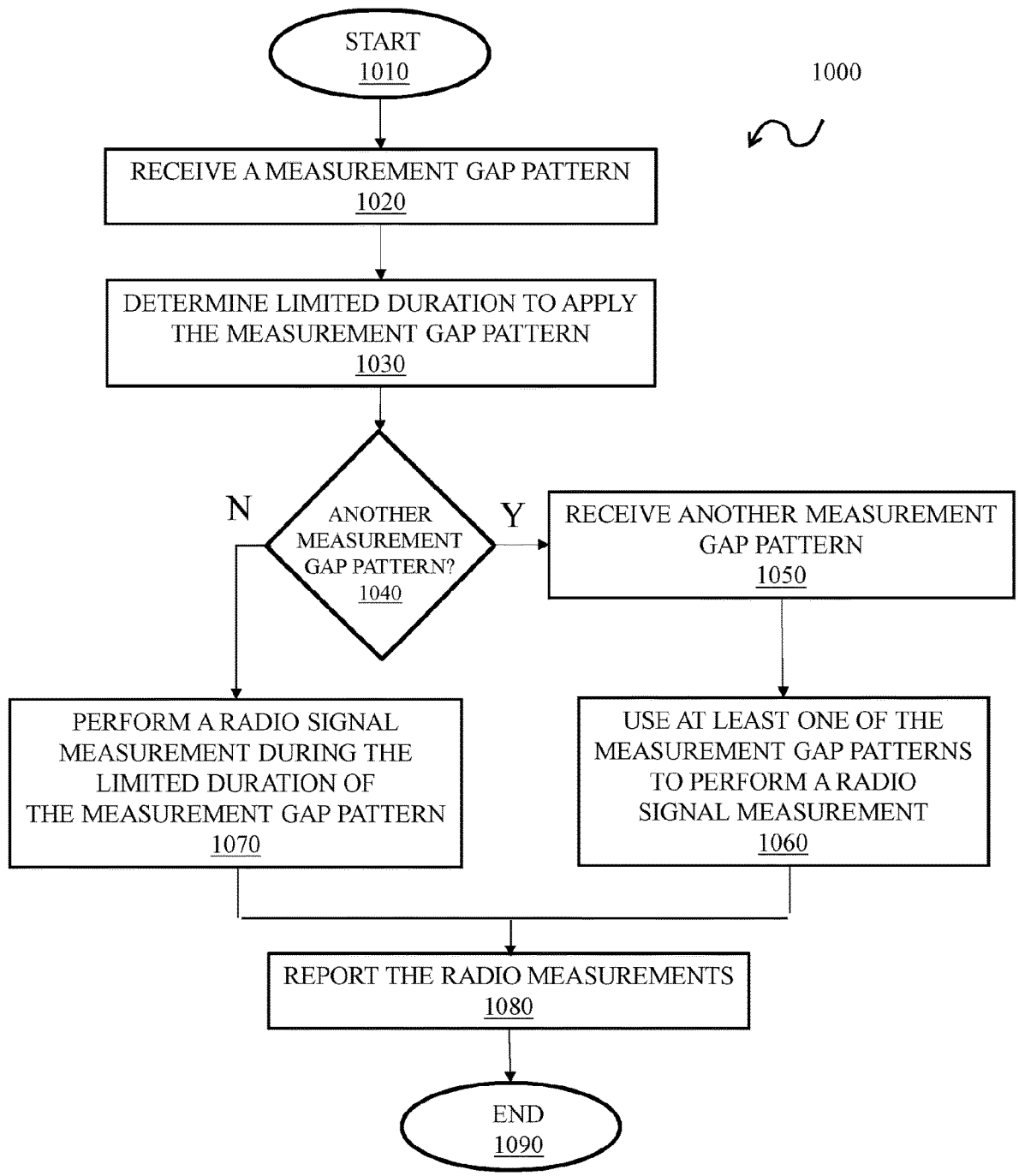
FIGS. 10 and 11 illustrate flow diagrams of embodiments of methods of operating a communication system.

Turning now to FIG. 10, illustrated is a flow diagram of an embodiment of a method 1000 of operating an apparatus such as a user equipment (370) of a communication system (300). In addition to the method steps, the discussion of the method 1000 identifies example elements (in parentheses) from preceding FIGUREs. The method 1000 begins at a start step or module 1010. At a step or module 1020, the user equipment (370) receives a measurement gap pattern (610, 710) to perform a radio signal measurement from the communication system (300). The measurement gap pattern (610, 710) includes a plurality of measurement gaps (620, 720, 740, 760). The measurement gap pattern (610, 710) may include a periodic repeating pattern of measurement gaps (620), an aperiodic repeating pattern of measurement gaps (720, 740, 760), or combinations thereof. The measurement gap pattern (610, 710) may cover a portion of a synchronization signal burst (630, 730, 750, 770). The user equipment (370) may receive the measurement gap pattern (610, 710) via at least one of multicast signaling, broadcast signaling, and dedicated signaling. The user equipment (370) may also receive the measurement gap pattern (610, 710) via at least one of radio resource control ("RRC") and control channel signaling.

The user equipment (370) determines a limited duration to apply the measurement gap pattern (610, 710) to perform the radio signal measurement at a step or module 1030. The user equipment (370) dynamically determines the measurement gap pattern (610, 710) in real time with/without the assistance of a network node (340) of the communication system (300). The user equipment (370) may determine the limited duration by applying a rule based on the measurement gap pattern (610, 710), and/or based on a message received from the communication system (300). The limited duration may depend on at least one of a configuration of radio signals outside of a duration covered by the measurement gap pattern (610, 710), a gap length or gap periodicity of the measurement gap pattern (610, 710), a measurement period by the user equipment (370) of the radio signal measurement, and a reported measurement event associated with the radio signal measurement.

At a decisional step or module 1040, the method 1000 determines if another measurement gap pattern (610, 710) will be provided by the communication system (300). If another measurement gap pattern (610, 710) is incorporated into the communication system (300), the user equipment (370) receives another measurement gap pattern (610, 710), at a step or module 1050, and selectively uses at least one of the measurement gap pattern (610, 710) and the another measurement gap pattern (610, 710) to perform the radio signal measurement at a step or module 1060. The user equipment (370) may selectively use the measurement gap pattern (610, 710) for the limited duration and the another measurement gap pattern (610, 710) after the limited duration expires. The user equipment (370) may selectively use at least one of the measurement gap pattern (610, 710) and the another measurement gap pattern (610, 710) based on prior knowledge about a transmission beam detected by the user equipment (370), a numerology, a coverage level, a pre-defined rule or condition, a switching time to perform the radio signal measurement by the user equipment (370), a prohibited period of time for communication by the user equipment (370), and at least one of a trigger and a triggering condition. The method then proceeds to a step or module 1080.

If the another measurement gap pattern (610, 710) is not incorporated into the communication system (300), the user equipment (370) performs the radio signal measurement during the limited duration of the measurement gap pattern (610, 710) at a step or module 1070. The radio signal measurement includes, without limitation, an intra-frequency measurement, an inter-frequency measurement and an inter-radio access technology measurement. The user equipment (370) also reports the radio signal measurement to the communication system (300) at a step or module 1080. The method 1000 ends at a step or module 1090.

Figure 11:
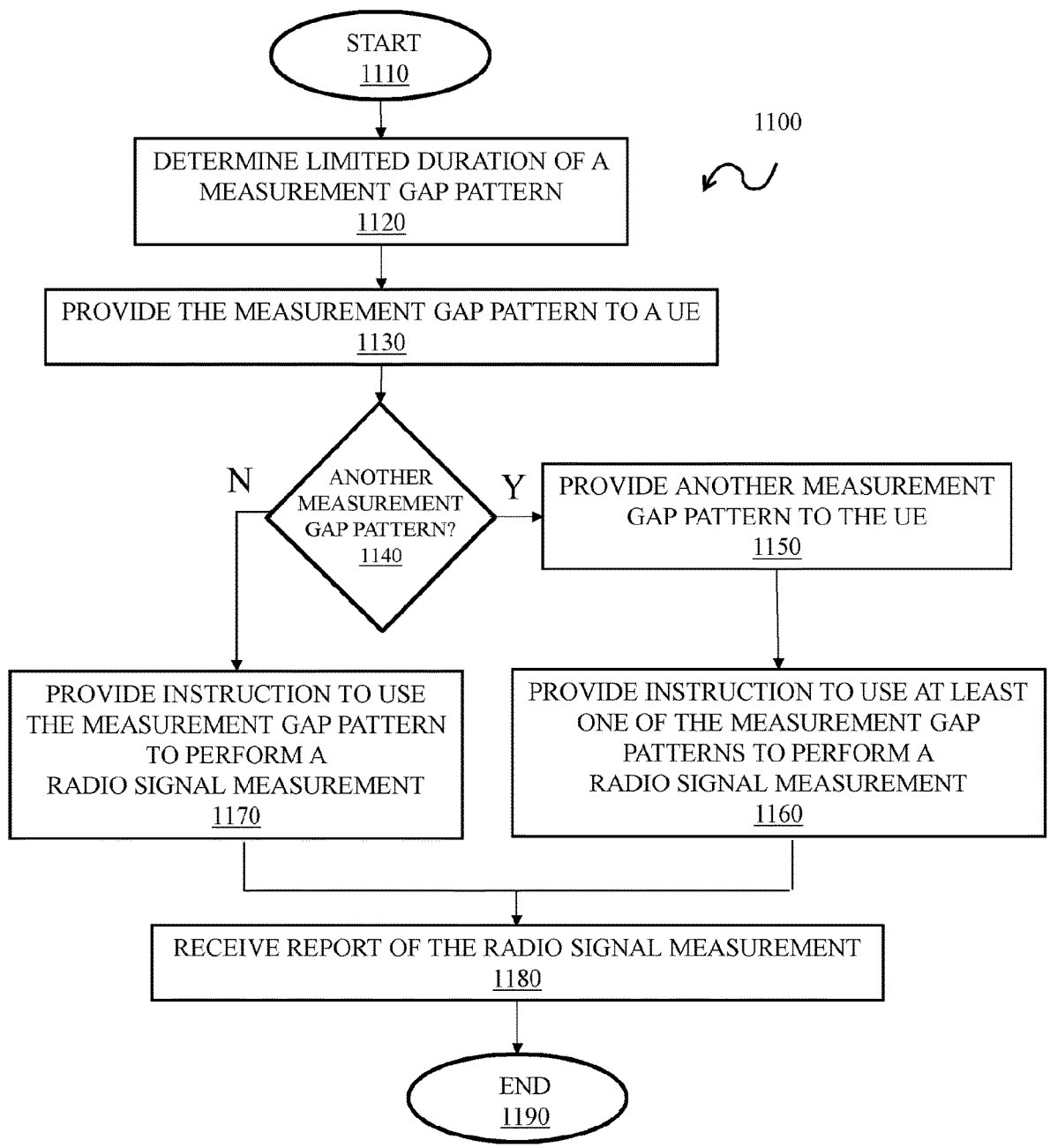

Turning now to FIG. 11, illustrated is a flow diagram of an embodiment of a method 1100 of operating an apparatus such as a network node (340) of a communication system (300). In addition to the method steps, the discussion of the method 1100 identifies example elements (in parentheses) from preceding FIGUREs. The method 1100 begins at a start step or module 1110. At a step or module 1120, the network node (340) determines a limited duration of a measurement gap pattern (610, 710) for a user equipment ("UE", 370) to perform a radio signal measurement. The measurement gap pattern (610, 710) includes a plurality of measurement gaps (620, 720, 740, 760). The measurement gap pattern (610, 710) may include a periodic repeating pattern of measurement gaps (620), an aperiodic repeating pattern of measurement gaps (720, 740, 760), or combinations thereof. The measurement gap pattern (610, 710) may cover a portion of a synchronization signal burst (630, 730, 750, 770).

The network node (340) dynamically determines the measurement gap pattern (610, 710) in real time with/without the assistance of the communication system (300). The network node (340) may determine the limited duration by applying a rule based on the measurement gap pattern (610, 710), and/or based on a message received from the communication system (300). The limited duration may depend on at least one of a configuration of radio signals outside of a duration covered by the measurement gap pattern (610, 710), a gap length or gap periodicity of the measurement gap pattern (610, 710), a measurement period by the user equipment (370) of the radio signal measurement, and a reported measurement event associated with the radio signal measurement.

At a step or module 1130, the network node (340) provides the measurement gap pattern (610, 710) to the user equipment (370) to perform the radio signal measurement. In accordance therewith, the network node (340) may provide the limited duration of the measurement gap pattern (610, 710) to the user equipment (370). The network node (340) may provide the measurement gap pattern (610, 710) via at least one of multicast signaling, broadcast signaling, and dedicated signaling. The network node (340) may also provide the measurement gap pattern (610, 710) via at least one of radio resource control ("RRC") and control channel signaling.

At a decisional step or module 1140, the method 1000 determines if another measurement gap pattern (610, 710) will be provided by the communication system (300). If another measurement gap pattern (610, 710) is incorporated into the communication system (300), the network node (340) provides the another measurement gap pattern (610, 710) to the user equipment (370), at a step or module 1150, and provides an instruction to the user equipment (370) to selectively use at least one of the measurement gap pattern (610, 710) and the another measurement gap pattern (610, 710) to perform the radio signal measurement at a step or module 1160. The network node (340) may provide the instruction to the user equipment (370) to selectively use the measurement gap pattern (610, 710) for the limited duration and the another measurement gap pattern (610, 710) after the limited duration expires. The network node (340) may provide the instruction to the user equipment (370) to selectively use at least one of the measurement gap pattern (610, 710) and the another measurement gap pattern (610, 710) based on based on prior knowledge about a transmission beam detected by the user equipment (370), a numerology, a coverage level, a pre-defined rule or condition, a switching time to perform the radio signal measurement by the user equipment (370), a prohibited period of time for communication by the user equipment (370), and at least one of a trigger and a triggering condition. The method then proceeds to a step or module 1180.

If the another measurement gap pattern (610, 710) is not incorporated into the communication system (300), the network node (340) provides an instruction to the user equipment (370) to use the measurement gap pattern (610, 710) to perform the radio signal measurement at a step or module 1170. The radio signal measurement includes, without limitation, an intra-frequency measurement, an inter-frequency measurement and an inter-radio access technology measurement. The network node (340) receives a report of the radio signal measurement from the user equipment (370) at a step or module 1180. The method 1100 ends at a step or module 1190.

Any steps or features described herein are merely illustrative of certain embodiments. It is not required that all embodiments incorporate all the steps or features disclosed nor that the steps be performed in the exact order depicted or described herein. Furthermore, some embodiments may include steps or features not illustrated or described herein, including steps inherent to one or more of the steps disclosed herein.

Any appropriate steps, methods, or functions may be performed through a computer program product that may, for example, be executed by the components and equipment illustrated in one or more of the figures above. For example, storage (memory) may include computer readable means on which a computer program can be stored. The computer program may include instructions which cause processor or processing circuitry (and any operatively coupled entities and devices, such as interface and storage) to execute methods according to embodiments described herein. The computer program and/or computer program product may thus provide means for performing any steps herein disclosed.

Any appropriate steps, methods, or functions may be performed through one or more functional modules. Each functional module may comprise software, computer programs, sub-routines, libraries, source code, or any other form of executable instructions that are executed by, for example, a processor. In some embodiments, each functional module may be implemented in hardware and/or in software. For example, one or more or all functional modules may be implemented by processors, possibly in cooperation with storage. The processors and storage may thus be arranged to allow processors to fetch instructions from storage and execute the fetched instructions to allow the respective functional module to perform any steps or functions disclosed herein.

Although the embodiments and its advantages have been described in detail, it should be understood that various changes, substitutions, and alterations can be made herein without departing from the spirit and scope thereof as defined by the appended claims. For example, many of the features and functions discussed above can be implemented in software, hardware, or firmware, or a combination thereof. Also, many of the features, functions, and steps of operating the same may be reordered, omitted, added, etc., and still fall within the broad scope of the various embodiments.

Moreover, the scope of the various embodiments is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein may be utilized as well. Accordingly, the appended claims are intended to include within their scope such processes, machines, manufacture, compositions of matter, means, methods, or steps.

What is claimed is:

1. An apparatus operable in a communication system, the apparatus comprising:
  processing circuitry configured to:
    receive a first measurement gap pattern from the communication system;
    determine a limited duration for using the first measurement gap pattern;
    perform radio signal measurements during the limited duration using the first measurement gap pattern; and
    stop use of the first measurement gap pattern, upon reaching the end of the limited duration.

2. The apparatus of claim 1, wherein said processing circuitry is configured to determine the limited duration according to a rule that is predefined for the first measurement gap pattern.

3. The apparatus of claim 1, wherein the processing circuitry is configured to determine the limited duration from a transmission configuration of a signal to be received or measured by the apparatus.

4. The apparatus of claim 1, wherein the processing circuitry is configured to determine the limited duration based on receiving signaling from the communication system that indicates the limited duration.

5. The apparatus of claim 1, wherein the processing circuitry is configured to determine the limited duration based on a rule that depends on the individual gap length of the gaps defined by the first measurement gap pattern or a gap periodicity of the first measurement gap pattern.

6. The apparatus of claim 1, wherein the first measurement gap pattern is used for performing radio signal measurements with respect to Synchronization Signal Bursts (SSBs) transmitted by a radio network node of the communication system, and wherein the limited duration covers a portion of a SSB.

7. The apparatus of claim 1, wherein the first measurement gap pattern is one among two or more measurement gap patterns received from the communication system, and wherein the processing circuitry is configured to select another one of the two or more measurement gap patterns to use for performing radio signal measurements, after stopping use of the first measurement gap pattern.

8. A method of operating an apparatus in a communication system, the method comprising:
- receiving a first measurement gap pattern from the communication system;
- determining a limited duration for using the first measurement gap pattern;
- performing radio signal measurements during the limited duration using the first measurement gap pattern; and
- stopping use of the first measurement gap pattern, upon reaching the end of the limited duration.

* * * * *